Patented Mar. 22, 1938

2,111,719

UNITED STATES PATENT OFFICE 2,111,719

IGNITION MIXTURES FOR PERCUSSION CAPS OF ALL KINDS, SMALL MUNITIONS, AND PRIMERS

Bronislaw Zieliński, Stary Bierun, High Silesia, Poland

No Drawing. Application November 12, 1936, Serial No. 110,551. In Poland November 18, 1935

2 Claims. (Cl. 52—4)

My invention relates to improvements in ignition mixtures for percussion caps of all kinds, small munitions and primers.

Percussion caps having as ignition mixture containing mercuric fulminate and potassium chlorate have the drawback that the resulting vapour causes rusting of the gun barrels, for which reason the mercuric fulminate and the potassium chlorate are replaced by compounds by the explosion of which rusting is avoided.

For the preparation of such mixtures, a mixture of normal lead trinitroresorcinate with oxygen carriers and the like, mainly with barium or lead nitrate, is used. The use of lead trinitroresorcinate for the preparation of ignition mixtures is described in the Polish specification No. 1,410.

It has been found, however, that the ignition mixtures containing trinitroresorcinate have a very slight sensitiveness to percussion, for which reason it is necessary to incorporate with the ignition mixtures a substance which increases the said sensitiveness. According to the Polish specification No. 12,014, guanyl-nitro-azo-amino-guanyl-tetrazene is used as a substance of the said kind.

According to this invention 2.4.6-trinitro-1.3.5-triazidobenzene is used, the said compound having the effect of increasing the sensitiveness to percussion of trinitroresorcinate ignition mixtures. Trinitrotriazidobenzene was prepared by Oldrich Turek in the year 1924 as a material suitable for the preparation of detonating caps and for the replacement of mercuric fulminate. Turek states that the said compound has the advantage of a comparatively low sensitiveness to friction and percussion and, indeed, that the same is lower than the sensitiveness of mercuric fulminate.

Experiments have proved, however, that the sensitiveness of trinitrotriazidobenzene is greater than the sensitiveness of mercuric fulminate. The said compound is therefore suitable as a substance which increases the sensitiveness of trinitroresorcinate explosives.

Suitable ignition mixtures may, according to the present invention, have the following composition:—from 20 to 50 percent of normal lead trinitroresorcinate, from 30 to 50 per cent barium or lead nitrate, from 5 to 30 per cent antimony trisulphide, from 0 to 20 per cent glass or another agent promoting friction and from 0.25 to 10 per cent 2.4.6-trinitro-1.3.5-triazidobenzene.

Having now particularly described and ascertained the nature of my said invention and in what manner the same is to be performed I declare that what I claim is:—

1. Ignition mixtures for percussion caps, small munitions and primers comprising 20% to 50% normal lead trinitroresorcinate, 30 to 50% of a compound selected from the group consisting of barium nitrate and lead nitrate, 5 to 30% antimony trisulphide, a trace to 20% of a frictioning agent, and .25 to 10% 2.4.6-trinitro-1.3.5-triazidobenzene, the last component serving to increase the sensitiveness.

2. Ignition mixtures for percussion caps, small munitions and primers comprising 20 to 50% normal lead trinitroresorcinate, 30 to 50% barium nitrate 5 to 30% antimony trisulphide, a trace to 20% glass and .25 to 10% 2.4.6-trinitro-1.3.5-triazidobenzene, the last component serving to increase the sensitiveness.

BRONISLAW ZIELIŃSKI.